United States Patent [19]

Long et al.

[11] Patent Number: 5,236,323
[45] Date of Patent: Aug. 17, 1993

[54] AUTOMATIC MEAT TRIMMER APPARATUS AND METHOD

[76] Inventors: John W. Long, 12203 Nicholas St., Omaha, Nebr. 68154; David L. Thiede, 14825 N. 72nd St., Omaha, Nebr. 68122

[21] Appl. No.: 901,252

[22] Filed: Jun. 19, 1992

[51] Int. Cl.$^5$ .............................................. A22C 17/12
[52] U.S. Cl. ..................................... 452/127; 452/130
[58] Field of Search ................. 452/127, 125, 128, 130

[56] References Cited

U.S. PATENT DOCUMENTS

| | | | |
|---|---|---|---|
| Re. 23,222 | 4/1950 | Townsend | 452/127 |
| 2,261,589 | 11/1941 | Piper | 452/127 |
| 2,522,728 | 9/1950 | Townsend | 452/127 |
| 2,715,427 | 8/1955 | Townsend | 452/127 |
| 3,237,664 | 3/1966 | Macy et al. | 452/134 |
| 3,513,893 | 5/1970 | Townsend | 452/127 |
| 3,542,105 | 11/1970 | Townsend | 452/127 |
| 3,561,044 | 2/1971 | Evich | 452/127 |
| 3,613,154 | 10/1971 | Townsend | 452/127 |
| 3,733,997 | 5/1973 | Beasley | 452/127 |
| 3,949,661 | 4/1976 | Greider | 452/127 |
| 4,351,088 | 9/1982 | Leining et al. | 17/50 |
| 4,534,548 | 8/1985 | Hanau | 452/127 |
| 4,561,150 | 12/1985 | Townsend | 452/127 |
| 4,835,817 | 6/1989 | Jurs | 17/62 |
| 4,920,875 | 5/1990 | Schill | 452/127 |
| 5,098,336 | 3/1992 | DeLong | 452/130 |

*Primary Examiner*—Willis Little
*Attorney, Agent, or Firm*—John A. Beehner

[57] ABSTRACT

The automatic trimmer apparatus of the present invention includes a base frame and trimming blade mounted on the base frame for trimming unwanted material from the meat product. A feed conveyor is situated forwardly of the trimming blade for transporting the meat product to the trimming blade. A feed roller is mounted on the base frame adjacent the trimming blade to receive the meat product transported by the feed conveyor and to advance the meat product into trimming engagement with the trimming blade. A press roller is mounted on the base frame for rotating the meat in trimming engagement with the trimming blade. The method of the present invention includes providing an automatic trimmer having a feed conveyor, a feed roller and a trimming blade, placing a meat product to be trimmed on the feed conveyor, advancing the meat product on the feed conveyor to the feed roller means and rolling the meat product in a generally stationary position in trimming engagement with the trimming blade for circumferential trimming of a layer of material therefrom.

44 Claims, 6 Drawing Sheets

AUTOMATIC MEAT TRIMMER APPARATUS AND METHOD

BACKGROUND OF THE INVENTION

1. Technical Field

The method and apparatus of this invention relate generally to an apparatus and method of trimming an unwanted portion of material from a meat product. More specifically, it relates to an apparatus and method of trimming portions from a meat product which is of an extended, rounded shape such as shanks, knuckles and the like. Meat products as used herein are meant to refer broadly to beef, pork, poultry, and fish muscles and the like. Materials to be trimmed may be fat, membranes or the like.

Currently, extended, rounded meat products must be trimmed by hand or manually on a machine. This creates the possibility of serious injury to the hands. Additionally, there is a large reduction in efficiency due to the time required to perform these tasks by hand. Consequently, it is highly desirable to automate the process of trimming extended or rounded meat products.

2. Description of the Prior Art

Prior art devices for automatically trimming unwanted portions from meat products are well known in the art. However, these devices are generally limited to meat products which are flat.

An example of this type of prior art device is illustrated in Townsend, U.S. Pat. No. 3,613,154. This typical prior device consists of a pair of rollers with a sharp blade therebetween. One of the rollers, a feed roller, serves to frictionally engage the underside of the meat product as it enters the machine. The other roller a pressure roller, serves to maintain pressure on the top side of the meat keeping it engaged with the rollers and thereby urging it against the blade. The blade, being fixed in position, cuts the meat as the rollers force the meat past it. The trimmed meat may then be discharged by means of a belt or the like, located rearward of the cutting blade. Since the rotation of the rollers forces the meat product directly through the machine, only a flat meat product may be trimmed. Sending a rounded, extended circumference meat portion through such a prior art apparatus would result in the trimming of only a small tangential portion of material therefrom.

Consequently, the trimming of an unwanted portion from an extended, rounded shaped meat product such as knuckles, shanks and the like, had to be accomplished by hand either using a knife or a manual membrane skinning machine. These methods are extremely dangerous. Repetitive motion injuries, carpel tunnel problems, hand fatigue and hand lacerations are all possibilities resulting from hand skinning.

Safety glove apparatuses have been developed in order to address this potential for injury when hand trimming meat. An illustration of such an apparatus is Dubors, U.S. Pat. No. 5,025,175. This device uses a switch in the power signal of the machine which is controlled by a radio signal. If physical contact is made between the glove and the machine, the radio signal is interrupted, the switch is opened, and power is removed from the machine, shutting it off. A similar device is disclosed in Townsend, U.S. Pat. No. 4,996,742 wherein physical contact of the glove and machine causes an interruption in power to the machine.

Although the machines are designed to stop "substantially instantaneously," any delay is too long when the fingers are in close proximity to the blade. Thus, these methods are far from perfect and may instill a false sense of security in the operator, allowing him to think he is safe thereby perhaps causing him to lower his guard and actually increasing the possibility of injury. Additionally, even if the possibility of injury were eliminated, the inefficiency of such a method would remain. Consequently, there is a great need for an apparatus which is capable of automatically skinning these types of meat products.

Therefore, an object of the present invention is to provide an apparatus and method of safely and automatically removing unwanted material such as fat, membranes and the like from extended, rounded shape meat products such as shanks, knuckles and the like.

Another object of the present invention is to provide an apparatus which is capable of trimming a variety of different sizes of meat products.

Another object is to provide an apparatus capable of trimming material from a variety of meat product types such as beef, pork, fish and other muscles.

Still another object of the present invention is to provide an apparatus which is capable of trimming material from meat products of a variety of consistencies.

Yet another object of the present invention is to provide an apparatus which is capable of receiving a variety of operator inputs indicating various parameters associated with the type of meat product to be trimmed.

Finally, an object of the present invention is to sense the position of the meat product on the feed system such that the trimmer is capable of automatic initialization.

SUMMARY OF THE INVENTION

The present invention is directed to a method and apparatus for automatically trimming the unwanted portion from an extended, rounded meat product such as knuckles, shanks, and the like. Such meat products may consist of a variety beef, pork, fish, muscles and the like and unwanted material may be any variety of fat, membranes and the like.

The automatic trimmer apparatus of the present invention includes a base frame and trimming means mounted on the base frame for trimming unwanted material from the meat product. A feed means is situated forwardly of the trimming means for transporting the meat product to the trimming means. Feed roller means are mounted on the base frame adjacent the trimming means to receive the meat product transported by the feed means. The invention also includes a means for rotating the feed roller means in a direction to advance the meat product into trimming engagement with the trimming means and a press roller means mounted on the base frame for movement between a working position rearwardly of the trimming means and a discharge position above the trimming means. The press roller rotates in the same direction as the feed roller in the working position and in an opposite direction in the discharge position. Consequently, the press roller means is operative to engage and roll the meat product in a generally stationary position in trimming engagement with the trimming means for circumferential trimming of a layer of material therefrom, in the working position. When moved to the discharge position, the press roller means and feed means cooperate to advance the meat product forwardly past the trimming means.

The method of the present invention includes providing an automatic trimmer having a feed means, a feed roller and a trimming blade. Further steps include placing a meat product to be trimmed on the feed means, advancing the meat product on the feed means to the feed roller means, rotating the feed roller means in a direction to engage the meat product and advancing the meat product into trimming engagement with the trimming blade. The meat product is then rolled in a generally stationary position in trimming engagement with the trimming means for circumferential trimming of a layer of material therefrom. The trimmed meat is then discharged from the skinner.

The invention thus provides a great advantage over the prior art by allowing these extended, rounded portions of meat products to be automatically trimmed. Therefore, the possibility of injury to the operator's hand is essentially eliminated. Additionally, the process is greatly speeded up since the process is nearly entirely automated, allowing the operator to concentrate on ensuring a smooth flow of products.

DESCRIPTION OF THE PREFERRED EMBODIMENT

Figure 1:
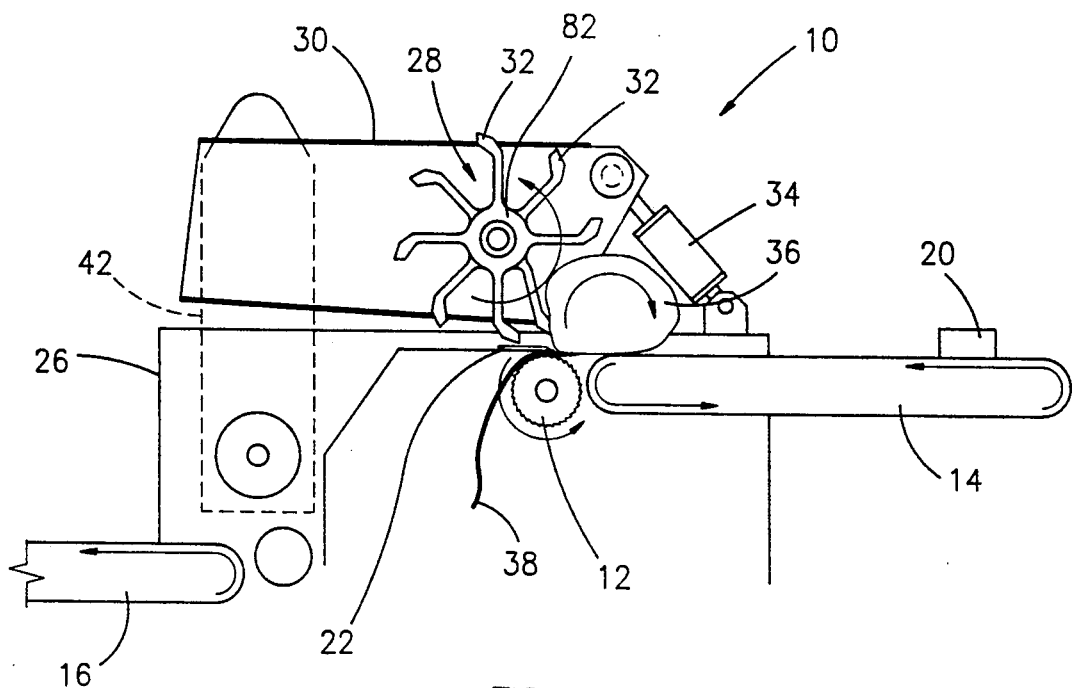
FIG. 1 is a partial cross-sectional side view of the automatic trimming apparatus in the working position.

The trimming operation of the invention is best shown in FIG. 1. The meat product 36 is transported by the feed conveyor 14 past the sensor 20 to the feed roller 12 and into trimming engagement with the trimming means 22. In the preferred embodiment the trimming means 22 is a blade but it could alternately be any other cutting devices such as a laser. Press roller means 28 is located above and slightly rearward of the feed roller 12. It will be noted in Figure that both press roller 28 and feed roller 12 are rotating in the same direction when the apparatus is in the trimming position. When the meat product 36 is brought into contact with the feed roller 12, the teeth of the feed roller 12 engage the meat product 36 moving it rearward, bringing it into trimming engagement with trimming blade 22.

Figure 3:
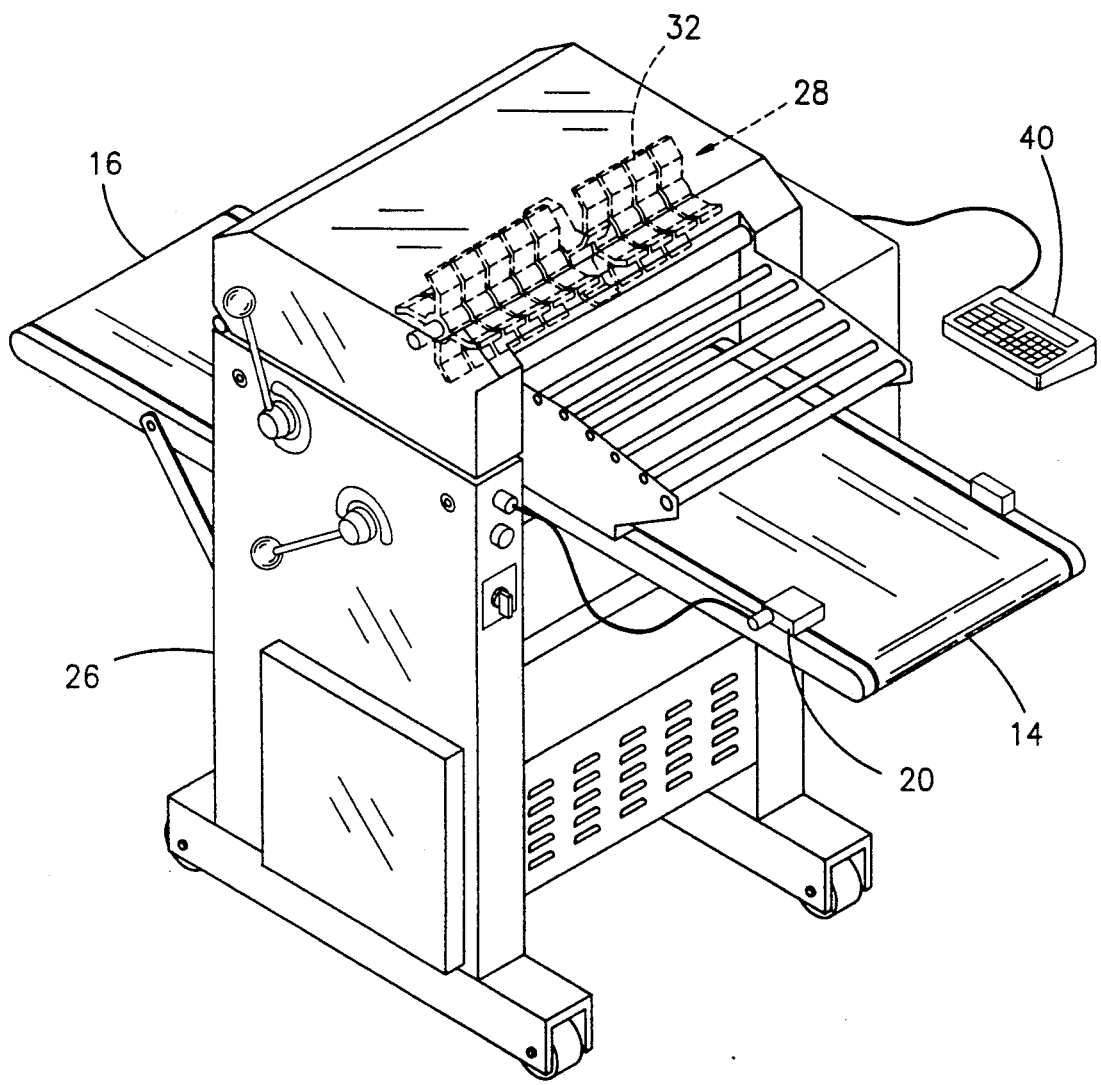
FIG. 3 is a perspective view showing the exterior features of the apparatus.

In the preferred embodiment, press roller 28 comprises a plurality of paddle wheels including resilient fingers 32 attached to a plurality of hubs 82 ridgly joined along an axis as shown in FIG. 3. Positioning of the press roller 28 allows fingers 32 to engage the meat product 36. Additionally, one of the paddle wheels is rotated out of line relative to others to facilitate engagement with the meat product 36. Simultaneous rotation of the press roller 28 in cooperation with the feed roller 12 causes the meat product 36 to roll in a generally stationary position and in trimming engagement with the trimming blade 22 causing material 38 to be trimmed therefrom.

It will be observed that the amount of material 38 trimmed is equal to the distance between the feed roller 12 and the trimming blade multiplied by the integer number of revolutions made by the meat product 36. The number of revolutions made by the meat product is in turn related to the circumferential size of the meat product 36, the speed of rotation of the press roller 28 and the feed roller 12, and the time the meat product is in trimming engagement with trimming blade 22. Thus the amount of material trimmed may be adjusted by varying the speed of the press roller 28 and the time the product is allowed to remain in trimming engagement.

Figure 2:
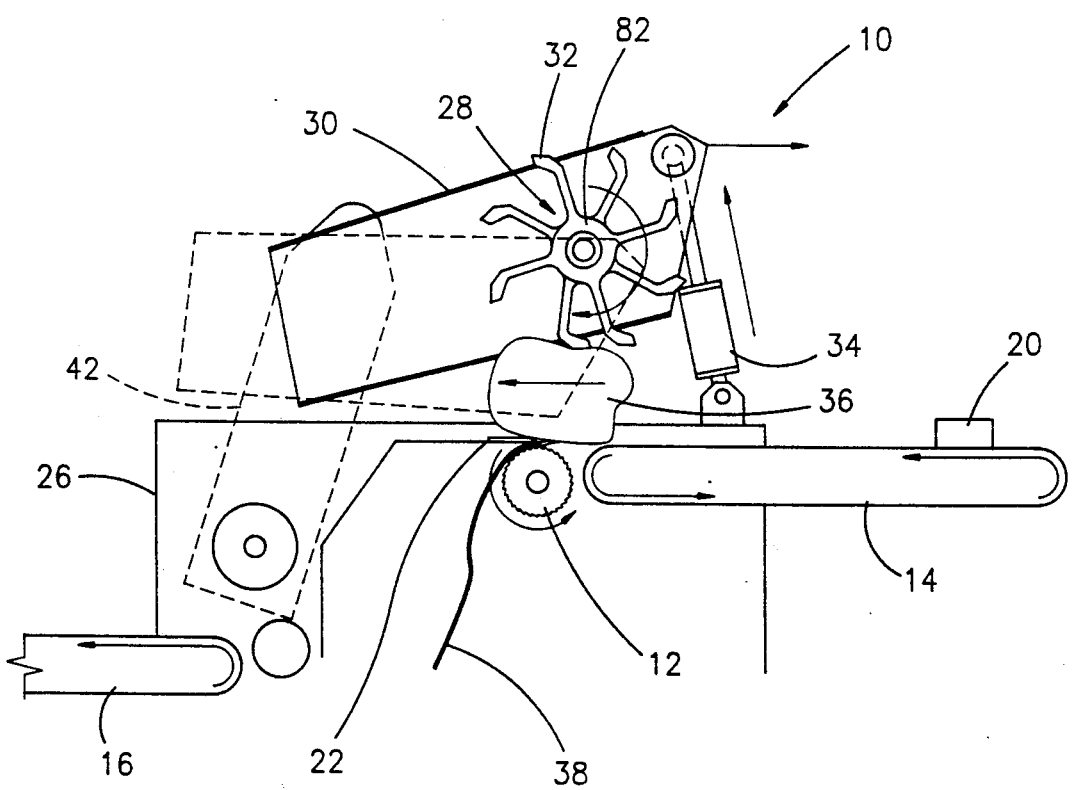
FIG. 2 is a is a partial cross-sectional side view of the invention in the discharge position.

Once the desired amount of material has been trimmed from meat product 36, the product is discharged. Discharge of the product is shown in FIG. 2. The carriage 30 begins to move forward in the direction of arrow 37 while at the same time, the press roller 28 stops its rotation. Forward movement of the carriage 30 causes the meat product 36 to be pushed forward, away from the trimming means 22. At this time, press roller 28 begins to rotate in the opposite clockwise direction as shown in FIG. 2 which, in cooperation with the feed means 14, causes the press roller 28 to engage the meat product 36 and to move it in a rearward direction through the machine. Additionally, carriage 30 also begins to move in a rearward direction and in combination with the feed conveyor 14, press roller 28, and feed roller 12, causes the product 36 to move past trimming blade 22 rapidly. The rapid movement of the meat product 36 prevents any additional trimming from the meat product as it moves past the trimming blade 22 to discharge conveyor 16. In the preferred embodiment, feed means 12 and discharge means 14 are conveyor belts but they could alternately be any variety of transport apparatuses.

As also shown in FIG. 2, the carriage 30 has the ability to be moved in an upward direction, as well as in a forward direction, by means of air cylinders 34. This allows press roller means 28 to accommodate larger meat products 36.

Once meat product 36 has been discharged from the rear of the apparatus by discharge means 16, the apparatus is ready to accommodate another meat product. The feed conveyor 14 transports another meat piece to be trimmed past sensor 20 which in turn reinitializes the system returning the carriage 30 to the working or trimming position and also causes press roller 28 to cease rotation in the clockwise direction and begin rotation in the counterclockwise direction as seen in FIGS. 2 and 1, respectively. Another meat product 36 is then transported by feed conveyor 14 to feed roller 12, which in cooperation with press roller 28, brings the meat product 36 into trimming engagement with trimming blade 22 and the entire trimming cycle is started again.

FIG. 3 is a perspective view of the exterior of the apparatus showing broad general features thereof, including the feed conveyor 14 operative to bring meat product into trimming engagement with trimming blade 22 (not shown) and discharge conveyor 16. Also shown in the figure is position sensor 20 located in the forward area of feed conveyor 14. Position sensor 20 is operative to indicate when another meat product is beginning transport through the machine, requiring initialization of the apparatus. The operator communication means 40 is also shown which allows the operator to input various parameters and data to the control means 100 (not shown). In the preferred embodiment, the operator communication means 40 is a membrane keypad with a display. Location of press roller means 28 and flexible fingers 32 are hidden but shown in dotted lines.

Figure 4:
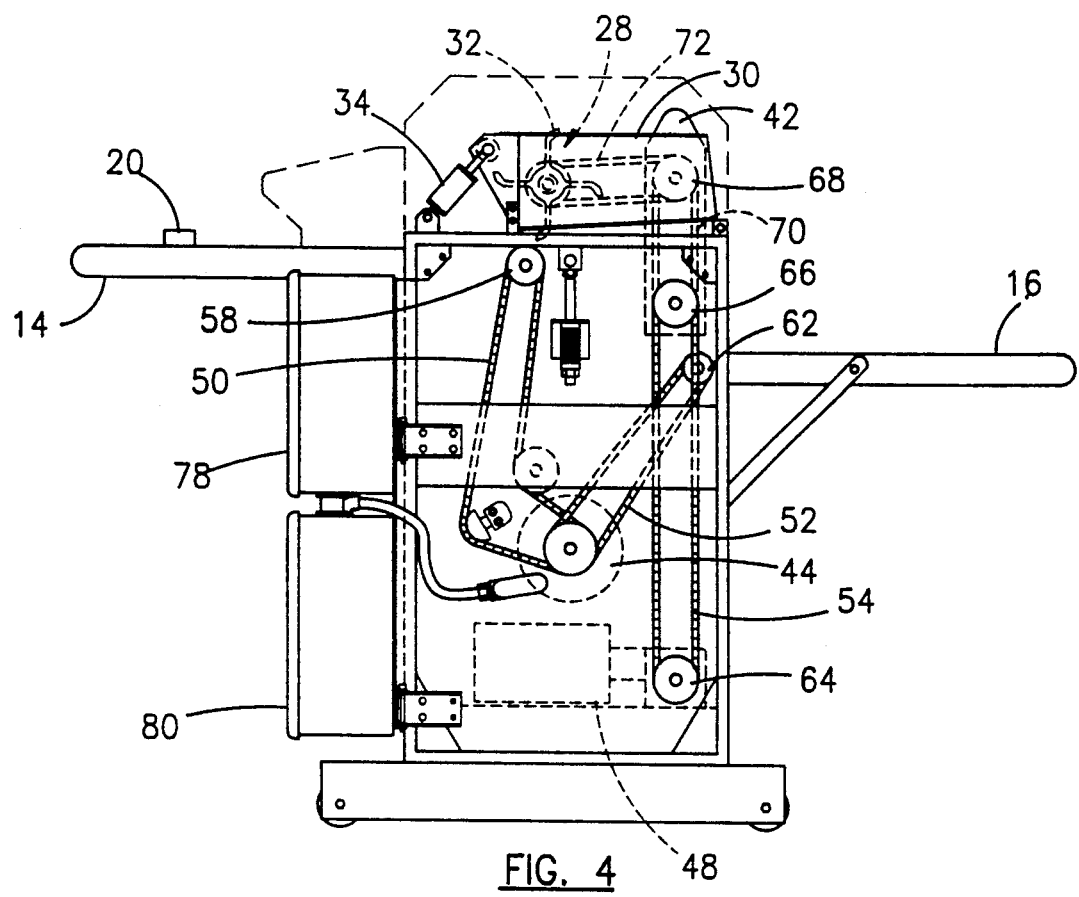
FIG. 4 is a cross-sectional side view showing the interconnection of the drive chains.
Figure 6:
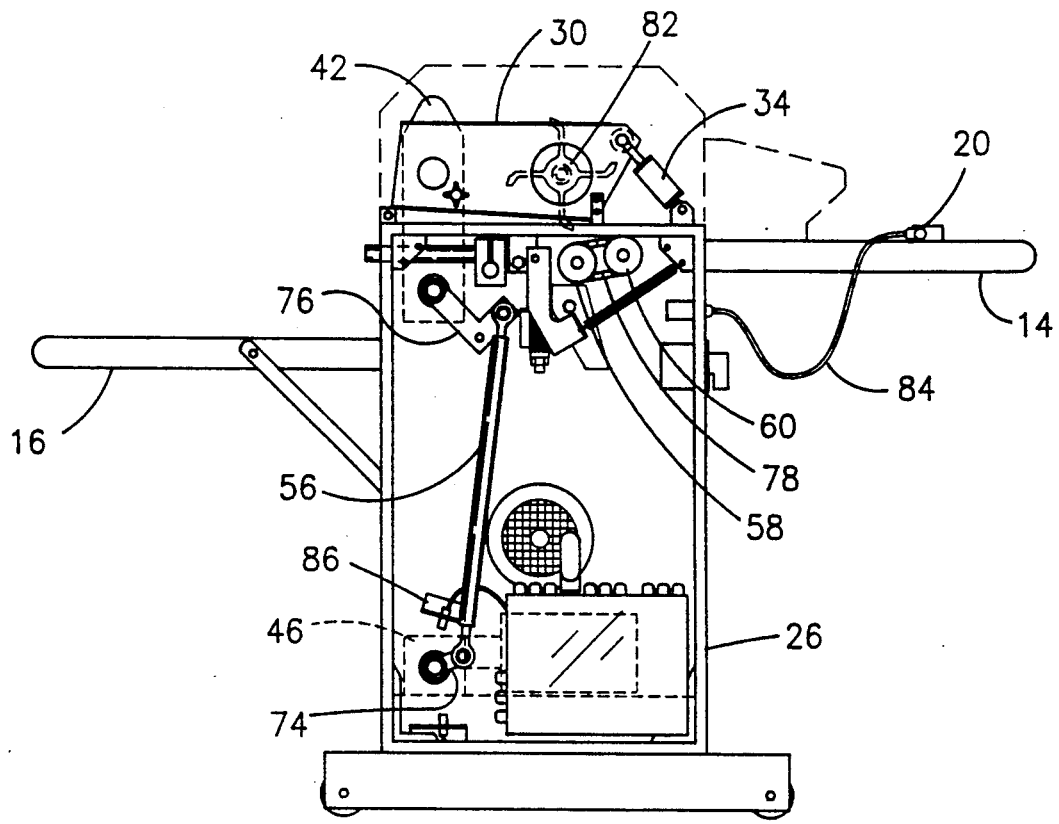
FIG. 6 is a cross-sectional side view showing the driving and position sensing mechanism for the carriage in its aft position.
Figure 7:
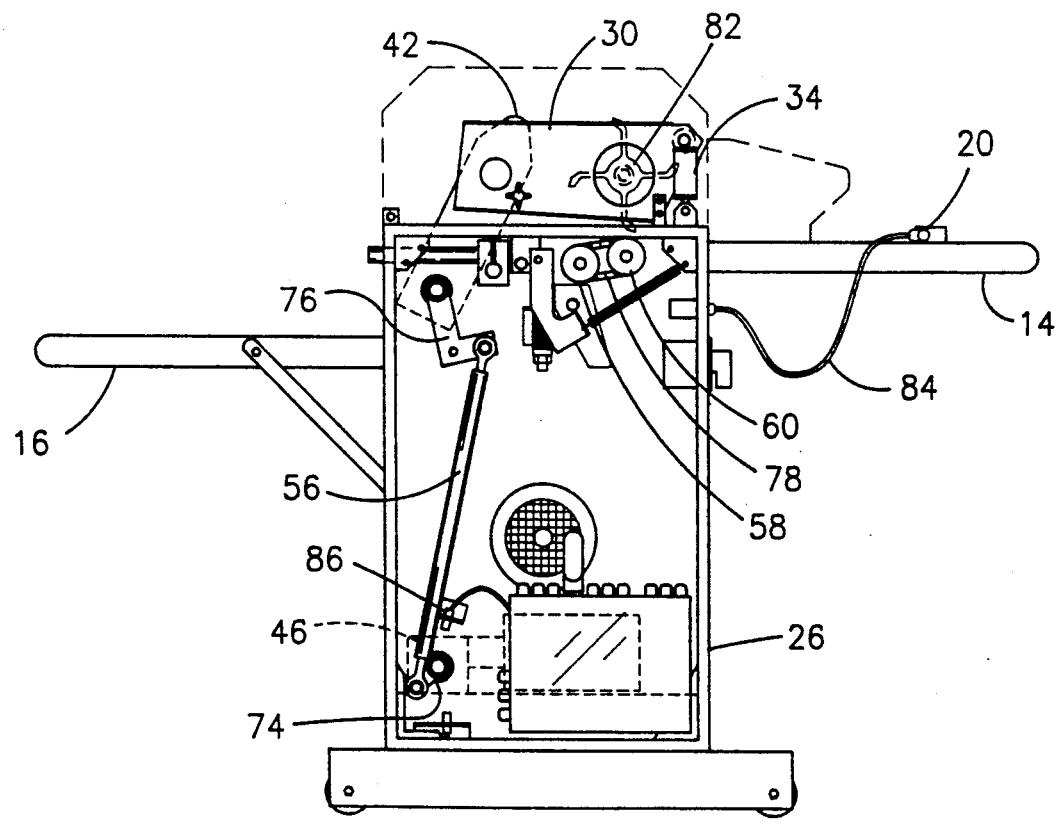
FIG. 7 is a cross-sectional side view showing the driving and position sensing mechanism for the carriage in its forward position.

FIG. 4 shows the interconnection of the three drive motors and the feed conveyor 14, discharge conveyor 16, feed roller 12, and press roller 28. Main drive motor 44 is connected to feed Conveyor 14 by main drive chain 50 through gear 58 and gear 60 (FIG. 6). Main drive 44 also drives feed roller 12 (not shown) by drive chain 50 and gear 58. Finally, main drive 44 is responsible for driving discharge conveyor 16 by discharge drive chain 52 and gear 62. In the preferred embodiment, main drive motor 44 is a horsepower A/C motor.

Also shown in FIG. 4 is the press roller motor 48. Press roller motor 48 rotates the press roller 28 by press roller drive chains 54, 70, and 72 and gears 64, 66, and 68. Gear 68 is located within carriage control arm 42 thereby allowing simultaneous lateral and vertical movement of the carriage 30 and rotation of press roller 28. Drive motor 48 is a variable speed, bidirectional drive to accommodate the working and discharge functions of the press roller 28 and varying operational parameters related to meat product such as size, consistency, and trimming amount.

Figure 5:
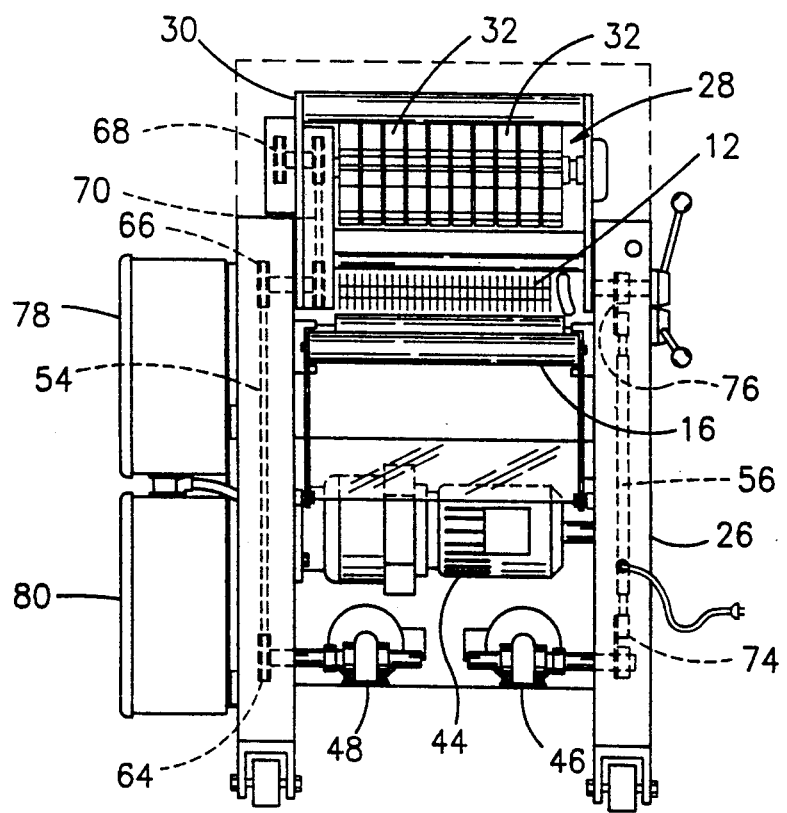
FIG. 5 is a rearview of the apparatus showing the locations of the three drive motors.

FIG. 5 is a rear view of the apparatus showing the location of the three drive motors.

Press roller motor 48 is connected with press roller 28 by means of gears 64, 66, and 68 and press roller drive chain 54, 70, and 72 (not shown). Also shown is the carriage drive motor 46 and its interconnection to the carriage control shaft 56 through connecting arm 74.

FIG. 6 is a side cross-sectional view showing in detail the driveconnections for the carriage 30. Carriage 30 is connected by carriage control arm 42 and connecting lever 76, to carriage control shaft 56. Carriage control shaft 56 is connected to carriage drive motor 46 by connecting arm 74. Rotation of motor 46 causes connecting arm 74 to rotate causing carriage control shaft 56 to move in an upward or downward direction which in turn causes connecting lever 76 to pivot causing carriage control arm 42 to rock which in turn causes carriage 30 to move forward or aft.

Also shown in FIG. 6 is the connection of the feed conveyor 14 with the main drive 44 (not shown) through gears 60 and gear 58 by chain 78. Also shown in the figure is the location of the position sensor 20 at the forward end of feed conveyor 14 and the connection of the sensor 20 to the apparatus by means of electrical cable. The position sensor 20 is operative to identify incoming meat product and send a sensing signal to control means 100 (not shown), whereby the apparatus is initialized.

Figure 8:
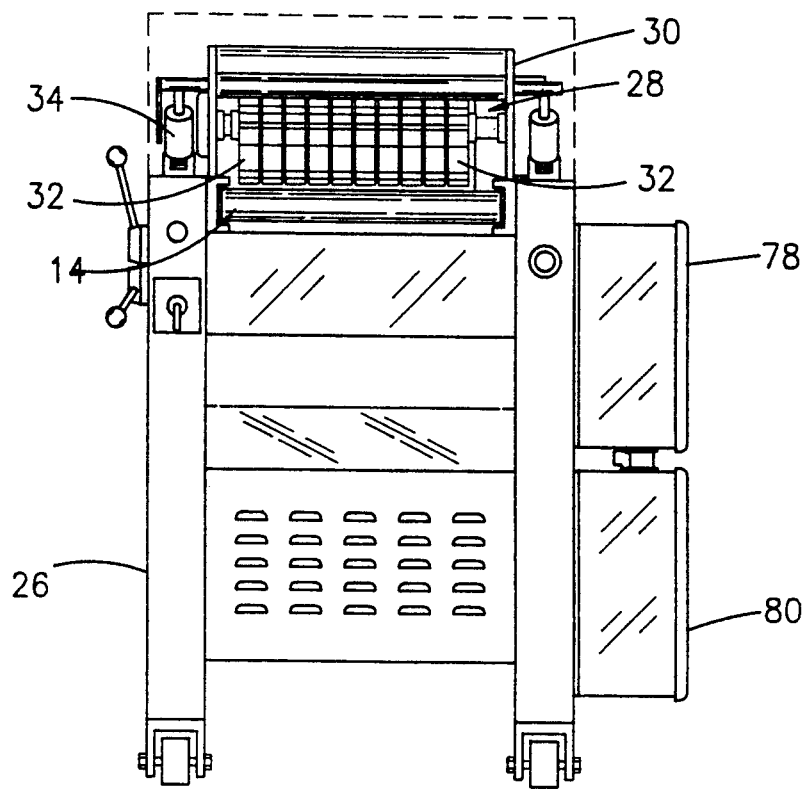
FIG. 8 is a front view of the apparatus.

FIG. 8 is a front view of the apparatus showing the location of various components of the apparatus including the carriage 30, the press roller 28, flexible fingers 32, the air cylinders 34 and the feed conveyor 14. Also shown in the figure are cabinets 78 and 80 which house the control means 100 (not shown).

Figure 9:
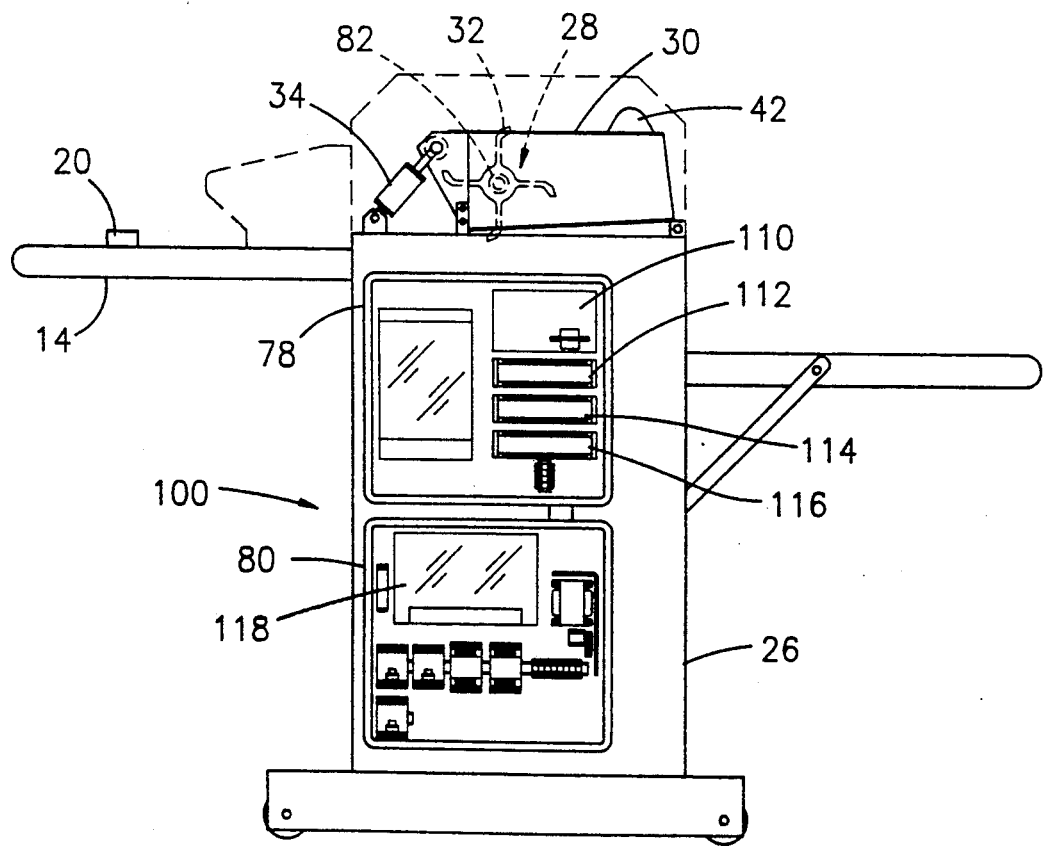
FIG. 9 is a side view of the apparatus with the electronics box doors opened, exposing the control circuits.

FIG. 9 is a side view with cabinets 78 and 80 open to show control means 100. Control means 100 is used to input and process various parameters to accommodate meat products of varying sizes, consistencies, and trimming amounts. Control means 100 comprises central processing unit 110 which is used to process and store relevant data. Control means 100 further comprises DC inputs 112, DC outputs 114, and analog outputs 116, all of which are operative to monitor various sensor locations in the apparatus, input data to, and receive output from, the central processing unit 110. Analog output 116 receives motor control data from the central processing unit 112 and sends data to the voltage controller 118. Voltage controller 118 is used to receive motor control data and to convert this data into outputs which are used to control the speed and direction of the press roller motor 48.

Central processing unit 110 is also connected to the operator communication means 40 (not shown). The operator communication means 40 is used to input various data and parameters concerning different meat products into the central processing unit 110, to prompt the operator for input data, and display data to the operator. Several parameters are used by the control means 100 to adjust the operation of the trimmer apparatus to accommodate various meat products. These include: length of time press roller 28 rotates the product while in trimming engagement with the trimming blade 22; length of time the carriage 30 is in the forward/discharge position; working position of the carriage 30 during trimming; press roller 28 forward/reverse rotation speed; length of time for press roller 28 discharge rotation. In the preferred embodiment, these inputs are entered by the operator via the communication means 40, and may be varied to accommodate various meat product requirements. It is also contemplated that various data may be acquired automatically by additional sensing means, thereby further automating the process by eliminating the need of the operator to enter some or all of the above data. For example, a sensor capable of determining the size of the meat product to be trimmed, could be placed along the feed means 14. The control means could then process this data and adjust the pertinent parameters. Additionally, a sensor could be used to determine the quantity of the material to be removed and the parameters similarly adjusted.

An important function of the operator communication means 40 and the control means 100 is to monitor various sensors located throughout the apparatus. Many of the sensors are safety related and detection of an error condition by the sensor will interrupt power to the machine. These faults will then be displayed to the operator by means of the display on the operator communications means 40. Some of the sensors monitored by the control means 100 are "scrapper present," "conveyor present," "cover present," machine power, and motor overloads. Additionally, the control means monitors several performance sensors including a carriage position sensor 86 (FIG. 6) which indicates whether the carriage is in the rear/working position or the forward/discharge position. Also mentioned previously, the position sensor 20 is monitored to determine when to initialize the timing sequence for the trimming procedure.

Figure 10:
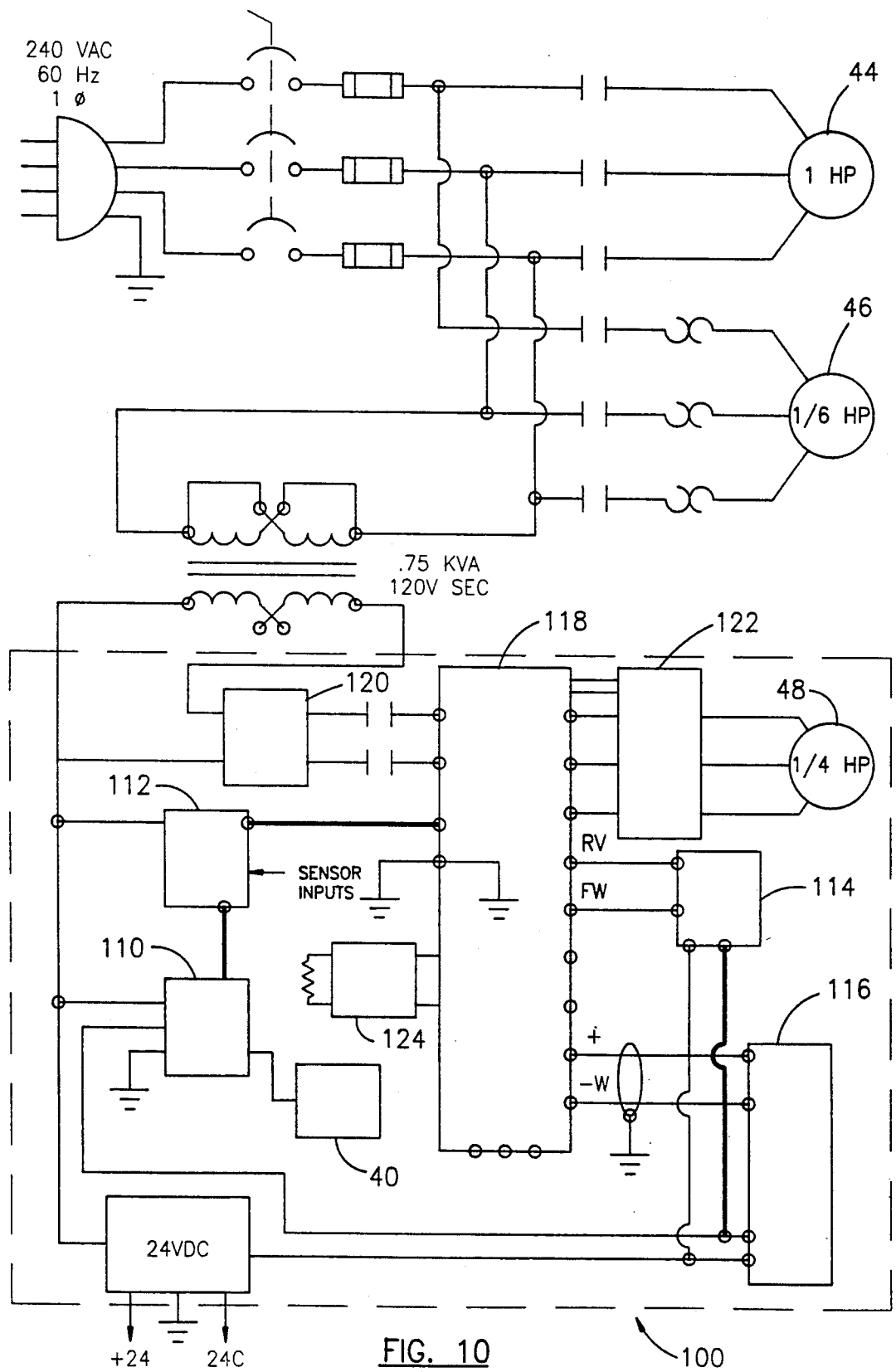
FIG. 10 is an electrical schematic diagram showing the motor controls, operator input means and logic circuits.

FIG. 10 is a schematic representation of the control means 100 and its interconnection with operator communication means 40 and the control motors 44, 46, and 48. The heart of the control means 100, is the central processing unit 110 which is in turn connected to the operator communication means 40, DC inputs 112, DC outputs 114 and analog output 116. Operator interaction with control means 100 is by operator communication means 40 which is electrically connected to central processing unit 110. The operator enters various parameters associated with a meat product to be trimmed into the operator communication means 40 which transfers the data into central processing unit 110 for processing and use of the data. Central processing unit 110 also takes various alarming parameters from DC input 112 to verify the apparatus is in safe working order before proceeding. Central processing unit 110 then processes operator input data and calculates proper rotational speed, carriage position and the like and sends this data to the analog output 116. The analog output 116 then sends this data to the voltage controller 118 which converts the data signals into voltages for use by the motors. The current is varied by the central processing unit 110 in accordance with the desired rotational speed of the motor. This current is then converted to a variable voltage by voltage controller 118 and sent from to the press roller motor 48. In addition the central processing unit 110 is also connected to DC output 114 which is in turn connected to Voltage controller 118. The DC output 114 is used to control the direction of rotation of the press roller motor 48.

Also shown in the FIG. 10 schematic diagram are the power filter 120, a phase/ground fault detector 122 and a dynamic breaker module 124. The power filter 120 is used to filter the power supplied to the press roller motor 48. The phase/ground fault detector 122 is connected between the press roller motor 48 and the voltage controller 118 and serves to protect both pieces of equipment by removing power whenever an electrical short is detected. Finally, breaker module 124 is connected to the voltage controller 118 and is used to dissipate excess current resulting from a change in rotation direction of the press roller motor 48.

In the preferred embodiment, the trimming sequence is begun when the meat product 36 passes the sensor 20. At this point, the control means 100 initializes the system resetting all parameters to their starting values. The carriage 30 assumes the home/working position (FIG. 1) while the feed conveyor 14 transports the meat product to the feed roller 12 and the press roller 28. Once the product reaches the blade 22 the rotation of the press roller 28 and the rotation of the feed roller 12 cause the meat product 36 to rotate in a generally stationary position about an axis over the blade. Additionally, due to the friction gripping capability of the feed roller 12, and the pressure exerted by the press roller 28, the meat product is kept in constant contact with the blade 22 causing an amount equal to the separation distance between the blade 22 and the feed roller 12, to be cut from the meat product 36. It will be observed that the amount of material trimmed from the meat product will also depend on the number of rotations of the product while it is in contact with the blade 22. This in turn depends on the speed of rotation and the length of time the product is allowed to rotate. These two parameters are entered by the operator at the time of start-up initialization and may be changed at any time. Once the time set for rotation of the press roller 28 has elapsed, it stops and the carriage 30 moves forward, knocking the product away from blade 22. The press roller 28 then begins to rotate in the opposite direction. As the feed conveyor 14 continues to carry the product back toward the press roller 28, the press roller 28 engages and captures the meat product 36. At the same time, the carriage 30 moves rearward and in cooperation with the feed conveyor 14, the meat product 36 is ejected past the blade 22 to the discharge conveyor 16 where it is transported away from the trimmer.

It is obvious that numerous other modifications and variations of the present invention are possible in view of the above teachings. For example, an important modification previously mentioned is to incorporate an automatic sensing means capable of sensing the size portion of the meat product to be trimmed. The control means might then be modified to access this data and use it to automatically set the system parameters which vary with product size. Such parameters might be the length of time to rotate the product, carriage position while trimming, carriage travel distance, etc. Another modification would be to incorporate a sensor capable of determining the consistency of the meat product and the unwanted material to be trimmed. The control means might then be modified to accommodate this data and modify the trimming procedure to accommodate that consistency of material such as speed of product rotation.

Therefore it is to be understood that the above description is intended in no way to limit the scope of protection of the claims and is representative only of the several possible embodiments of the present invention.

There has thus been shown and described an invention which accomplishes at least all of the stated objects.

I claim:

1. An automatic trimmer for removing a layer of material from a meat product comprising:
    a base frame;
    trimming means mounted on said base frame for trimming unwanted material from said meat product;
    feed means extending forwardly of said trimming means for transporting said meat product to said trimming means and for advancing said meat product into trimming engagement with said trimming means;
    a cooperative meat rolling means mounted on said base frame for movement between a working position rearwardly of said trimming means and a discharge position above said trimming means; and
    means for moving said meat rolling means from said working position wherein said meat rolling mean in cooperation with feed means is operative to roll said meat product in a generally stationary position in trimming engagement with said trimming means for circumferential trimming of a layer of material therefrom, to said discharge position wherein said feed means advances said meat product rearwardly past said trimming means.

2. An automatic trimmer for removing a layer of material from a meat product comprising:
    a base frame;
    trimming means mounted on said base frame for trimming unwanted material from said meat product;
    feed means extending forwardly of said trimming means for transporting said meat product to said trimming means, and for advancing said meat product into trimming engagement with said trimming means;
    a press roller means mounted on said base frame adjacent said trimming means; and
    means for reversibly rotating said press roller means in the same direction as said feed means wherein the forward edge of said press roller means is operative to engage and roll said meat product in a generally stationary position in trimming engagement with said trimming means for circumferential trimming of a layer of material therefrom, and in an opposite direction to said feed means wherein said press roller means and feed means cooperated to advance said meat product rearwardly past said trimming means.

3. An automatic trimmer for removing a layer of material from a meat product comprising:
  a base frame;
  trimming means mounted on said base frame for trimming unwanted material from said meat product;
  feed means situated forwardly of said trimming means for transporting said meat product to said trimming means;
  feed roller means mounted on said base frame adjacent said trimming means to receive said meat product transported by said feed means;
  means for rotating said feed roller means in a direction to advance said meat product into trimming engagement with said trimming means;
  a press roller means mounted on said base frame adjacent said trimming means; and
  means for reversibly rotating said press roller means in the same direction as said feed roller means wherein the forward edge of said press roller means is operative to engage and roll said meat product in a generally stationary position in trimming engagement with said trimming means for circumferential trimming of a layer of material therefrom, and in an opposite direction to said feed roller means wherein said press roller means and feed means cooperate to advance said meat product rearwardly past said trimming means.

4. The invention of claim 3 further comprising means for reciprocally moving said press roller means from a first position wherein said press roller means is rotated in the same direction as said feed roller means, to a discharge position forwardly thereof wherein said press roller means is rotated in said opposite direction.

5. The invention of claim 4 further comprising a carriage mounted on said base frame, said carriage rotatably supporting said press roller means and wherein said carriage is movable forward and aft on said base frame to move said press roller means between said working and discharge positions.

6. The invention of claim 3 wherein said press roller means comprises a flexible, generally paddle wheel shaped member having a plurality of resilient fingers attached thereto and operative to engage said meat product.

7. The invention of claim 3 wherein said press roller means comprises a plurality of resilient paddle wheels for engaging said meat product.

8. The invention of claim 7 wherein at least one of said paddle wheels substantially centered on said roller means is rotationally offset from the remaining paddle wheels.

9. The invention of claim 3 further comprising discharge means situated rearwardly of said trimming means for receiving and removing said meat products upon movement of said meat product past said trimming means.

10. The invention of claim 9 wherein said trimming means is a blade.

11. The invention of claim 10 wherein said feed roller means is a generally cylindrical member having grooves therein operative to frictionally engage meat product brought into contact therewith by said feed means.

12. The invention of claim 11 wherein said discharge and feed means are conveyor belts.

13. The invention of claim 3 further comprising sensing means for determining the position of a meat product on said feed means.

14. The invention of claim 13 wherein said sensing means is a photovoltaic sensing system.

15. The invention of claim 3 further comprising control means for adjusting the operation of said automatic trimmer to account for differing types of meat products.

16. The invention of claim 15 wherein said control means is operative to vary the rotation speed of said press roller means to account for different types of meat products.

17. The invention of claim 15 wherein said control means is operative to adjust the length of time meat product is rotated in trimming engagement with said trimming means.

18. The invention of claim 15 wherein said control means is operative to the vary speed at which said carriage travels between said working and said discharge positions.

19. The invention of claim 15 wherein said control means comprises an operator communication means, a computation means electrically connected thereto and operative to receive and process operator input data therefrom and further comprising a control interface means connected to said computation means and operative to receive data from said computation means, said control interface means processing said data and controlling the function of said automatic trimmings.

20. The invention of claim 19 wherein said operator communication means is a display/keypad.

21. The invention of claim 20 wherein said control interface is a plurality of direct current and analog output devices.

22. The inventor of claim 21 wherein said computation means is a programmable Logic Array.

23. An automatic trimmer for removing a layer of material from a meat product comprising:
  a base frame;
  trimming means mounted on said base frame for trimming unwanted material from said meat product;
  feed means situated forwardly of said trimming means for transporting said meat product to said trimming means;
  feed roller means mounted on said base frame adjacent said trimming means to receive said meat product transported by said feed means;
  means for rotating said feed roller means in a direction to advance said meat product into trimming engagement with said trimming means;
  a press roller means mounted on said base frame for movement between a working position rearwardly of said trimming means and a discharge position above said trimming means;
  means for reversibly rotating said press roller means in the working position in the same direction as said feed roller means and in an opposite direction in the discharge position; and
  means for reciprocally moving said press roller means from said working position wherein the forward edge thereof is operative to engage and roll said meat product in a generally stationary position in trimming engagement with said trimming means for circumferential trimming of a layer of material therefrom, to said discharge position wherein said press roller means and feed means cooperate to advance said meat product forwardly past said trimming means to said discharge means.

24. The invention of claim 23 wherein said means for reciprocally moving said press roller means is operative to lift said press roller means upon movement to the discharge position and to lower said press roller means upon movement to said working position.

25. The invention of claim 23 wherein said means for reciprocally moving said press roller means comprises a carriage mounted on said base frame, said carriage rotatably supporting said press roller means and being movable forward and aft on said base frame.

26. The invention of claim 23 wherein said press roller means comprises a flexible, generally paddle wheel shaped member having resilient finger attached thereto and operative to engage said meat product.

27. The invention of claim 23 wherein said press roller means comprises a plurality of resilient paddles for engaging said meat product.

28. The invention of claim 27 wherein at least one paddle wheel substantially centered on said press roller means is rotationally offset from remainder of said paddle wheels.

29. The invention of claim 23 further comprising discharge means situated rearwardly of said trimming means for receiving and removing said meat product upon movement of said meat product past said trimming means.

30. The invention of claim 29 wherein said trimming means is a blade.

31. The invention of claim 30 wherein said feed roller means is a generally cylindrical member having grooves therein operative to frictionally engage meat product brought into contact therewith by said feed means.

32. The invention of claim 31 wherein said discharge and feed means are conveyor belts.

33. The invention of claim 23 further comprising control means for adjusting the operation of said automatic trimmer to account for differing types of meat products.

34. The invention of claim 33 wherein said control means is operative to adjust the working position of said press roller means to engage varying sizes of meat products.

35. The invention of claim 33 wherein said control means is operative to adjust the length of time said meat product is rotated in trimming engagement with said trimming means.

36. The invention of claim 35 wherein said control means is operative to adjust the length of time press roller means remains in said forward discharge position.

37. The invention of claim 33 further comprising control means operative to vary the rotation speed of said press roller means to accommodate different types of meat products.

38. The invention of claim 33 wherein said control means comprises an operator communication means, a computation means electrically connected there to and operative to receive and process operator input data therefrom and further comprising a control interface means connected to said computation means and operative to receive data from said computation means, said control interface means processing said data and controlling the function of said automatic trimmer.

39. A method of trimming a layer of material from a meat product comprising:
providing an automatic trimmer comprising a feed means, a feed roller and a trimming blade;
placing a meat product to be trimmed on said feed means;
advancing said meat product on said feed means to said feed roller means;
rotating said feed roller means in a direction to engage said meat product and advancing said meat product into trimming engagement with said trimming blade;
rolling said meat product in a generally stationary position in trimming engagement with said trimming means for circumferential trimming of a layer of material therefrom; and discharging said trimmed meat product from said skinner.

40. The method of claim 39 wherein said rolling step comprises
providing a press roller,
positioning said press roller adjacent said trimming blade,
rotating said press roller in the same direction as said feed roller thereby engaging said meat product and flipping it forwardly over itself.

41. The method of claim 40 wherein said discharging step comprises reversing the direction of rotation of said press wheel whereby said press wheel and feed means cooperate to advance said meat product forwardly past said trimming means.

42. The method of claim 41 further comprising reciprocally moving said press wheel from a working position wherein the forward edge thereof is operative to engage and roll said meat product in a generally stationary position in trimming engagement with said trimming blade, to a discharge position forwardly thereof.

43. The method of claim 42 further comprising the step of sensing a meat product on said feed means and, in response thereto, moving said press wheel to the working position thereof and rotating said press wheel in the direction of rotation of said feed roller.

44. The method of claim 43 further comprising the step of imputing data associated with the meat product being trimmed and adjusting the working position of said press roller as a function of said data.

* * * * *